US008087302B2

(12) United States Patent
Boutros et al.

(10) Patent No.: US 8,087,302 B2
(45) Date of Patent: Jan. 3, 2012

(54) HANDS-FREE PUSH-TO-TALK DEVICE

(75) Inventors: Ramzy Boutros, Maple Valley, WA (US); Paul G. Anderson, Bellevue, WA (US); Charles F. Gidcumb, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 1385 days.

(21) Appl. No.: 11/624,961

(22) Filed: Jan. 19, 2007

(65) Prior Publication Data

US 2008/0173125 A1 Jul. 24, 2008

(51) Int. Cl.
*G01N 3/02* (2006.01)

(52) U.S. Cl. .......................................................... 73/856

(58) Field of Classification Search .................... 73/856; 379/387.02; 74/519

See application file for complete search history.

(56) References Cited

U.S. PATENT DOCUMENTS

| | | | | |
|---|---|---|---|---|
| 6,203,262 | B1 * | 3/2001 | Frich et al. | 414/331.01 |
| 6,758,454 | B2 * | 7/2004 | Smed | 248/314 |
| 7,091,416 | B1 * | 8/2006 | Tsentr et al. | 174/66 |
| 7,240,400 | B2 * | 7/2007 | Bonham | 16/238 |

* cited by examiner

*Primary Examiner* — Jewel V Thompson

(74) *Attorney, Agent, or Firm* — Caven & Aghevli LLC

(57) ABSTRACT

A push-to-activate device is disclosed. The push-to-activate device may comprise a mounting bracket coupled to a surface, and an adjustable hinge coupled thereto. The push-to-activate device may also feature a measuring instrument coupled to the mounting bracket and a deflectable arm coupled to the adjustable hinge, wherein the deflectable arm can be engaged in a hands-free manner. A method is also disclosed which comprises providing an apparatus, the apparatus comprising a mounting bracket coupled to a surface, an adjustable hinge coupled to the mounting bracket, a measuring instrument disposed within the mounting bracket, and a deflectable arm coupled to the adjustable hinge, wherein the deflectable arm can be engaged in a hands-free manner. The method also comprises utilizing the adjustable hinge to adjust the deflectable arm to fit a size constraint of an operator.

20 Claims, 3 Drawing Sheets

HANDS-FREE PUSH-TO-TALK DEVICE

GOVERNMENT LICENSE RIGHTS

This invention was made with U.S. Government support, under Government Contract No. N00019-04-C-3146, awarded by the U.S. Department of the Navy. The government has certain rights to this invention

FIELD OF INVENTION

The present embodiment relates generally to mechanical switches and more particularly to hands-free switching devices.

BACKGROUND OF THE INVENTION

Typically, mission console operators are required to relay messages frequently and briefly via a communication system, such as a head-set and microphone utilized within an intercom system. To accomplish the task of relaying messages frequently and briefly, it is desirable to have a hands-free push-to-activate device for utilizing a communication system. Accordingly, an operator can utilize a hands-free push-to-activate device while operating other console components such as a keyboard, trackball, hand controller, and other console controllers.

One example of a hands-free push-to-activate device is a hands-free push-to-talk assembly, which has been developed and utilized aboard aircraft to enable mission console operator communicate with passengers thereon. However, conventional hands-free push-to-talk assemblies are foot operated, which are limited in application due to the size differences between operators.

A supplier of mission consoles developed a knee-operated push-to-talk switch. However, these mission consoles were designed in a fashion that prevented an operator from rotating a seat forward and also posed a bump hazard to the operator.

Although the challenges of hands-free push-to-talk assemblies have been referenced in regards to mission consoles within aircraft, the use of hands-free push-to-talk assemblies and similar mechanical switches may pose problems in other environments that require hands-free activation such as, but not limited to, gaming consoles, communication systems, and within other systems where voice activated switches are either operationally unacceptable or inappropriate for an application.

Accordingly, what is desired is a system and method for providing a hands-free push-to-activate device that overcomes the aforementioned limitations.

BRIEF SUMMARY OF THE INVENTION

A push-to-activate device is disclosed. In a first embodiment, the push-to-activate device may comprise a mounting bracket coupled to a surface, and an adjustable hinge coupled thereto. The hands-free push-to-activate device also features a measuring instrument disposed within the mounting bracket and a deflectable arm coupled to the adjustable hinge, wherein the deflectable arm can be engaged in a hands-free manner.

In a second embodiment, a method comprises providing an apparatus, the apparatus comprising a mounting bracket coupled to a surface, an adjustable hinge coupled to the mounting bracket, a measuring instrument disposed within the mounting bracket, and a deflectable arm coupled to the adjustable hinge, wherein the deflectable arm can be engaged in a hands-free manner. The method also comprises utilizing the adjustable hinge to adjust the deflectable arm to fit a size constraint of an operator.

In a third embodiment, a push-to-activate device is provided which includes a T-shaped mounting bracket mounted to a surface. A breakaway hinge is coupled to the T-shaped mounting bracket, wherein the breakaway hinge comprises a first barrel and a second barrel. The first and second barrels are engagingly coupled such that a peak of the first barrel fits securely within a recess of the second barrel and a peak of the second barrel fits securely within a recess of the first barrel. A paddle-shaped deflectable arm coupled to the breakaway hinge, wherein the paddle-shaped deflectable arm comprises a first portion and a second portion, and wherein the first portion is slender in width but longer in length than the second portion and wherein the paddle-shaped deflectable arm can be deflected by the operator's knee. Additionally, a strain gauge is disposed within the T-shaped mounting bracket, wherein the strain gauge detects the deflection of the paddle-shaped deflectable arm.

BRIEF DESCRIPTION OF THE DRAWINGS

The present embodiment is illustrated by way of example and not limitation in the figures of the accompanying drawings, in while like references indicate similar elements, and in which.

DETAILED DESCRIPTION OF THE INVENTION

The following description is presented to enable one having ordinary skill in the art to make and use the embodiment and is provided in the context of a patent application and the generic principles and features described herein will be apparent to those skilled in the art. Thus, the present embodiment is not intended to be limited to the embodiments shown, but is to be accorded the widest scope consistent with the principles and features described herein.

Figure 1A:
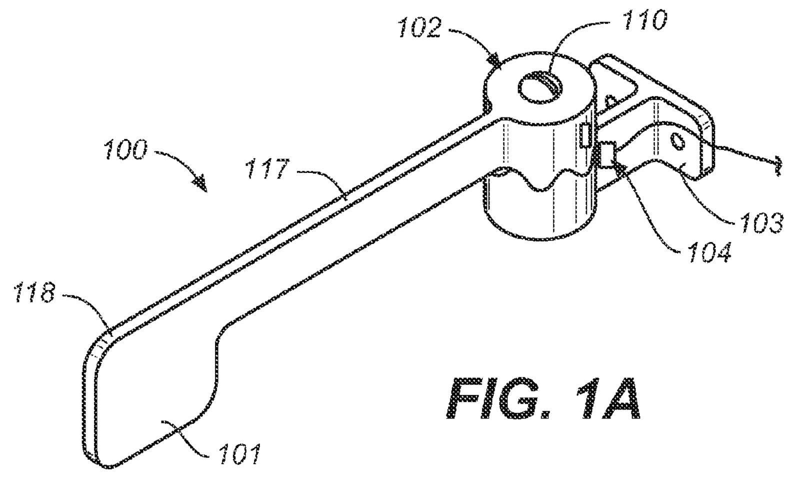
FIG. 1A shows a perspective view of a hands-free push-to-activate device according to an embodiment.

FIG. 1A shows a perspective view of a hands-free push-to-activate device 100 which includes a deflectable arm 101, an adjustable hinge 102, a mounting bracket 103, and a measuring instrument 104, according to an embodiment. For an embodiment, the deflectable arm 101 is adaptable to be engaged in a hands-free manner. As shown in FIG. 1A, the deflectable arm 101 may be connected to the mounting bracket 103 via the adjustable hinge 102. The mounting bracket 103 may have a T-shape to provide a location for the measuring instrument 104 and to facilitate mounting. The mounting bracket 103 may also provide mobility for the hands-free push-to-activate device 100 such that the device 100 may be moved to more desirable positions according to a need or preference of an operator.

Figure 1B:
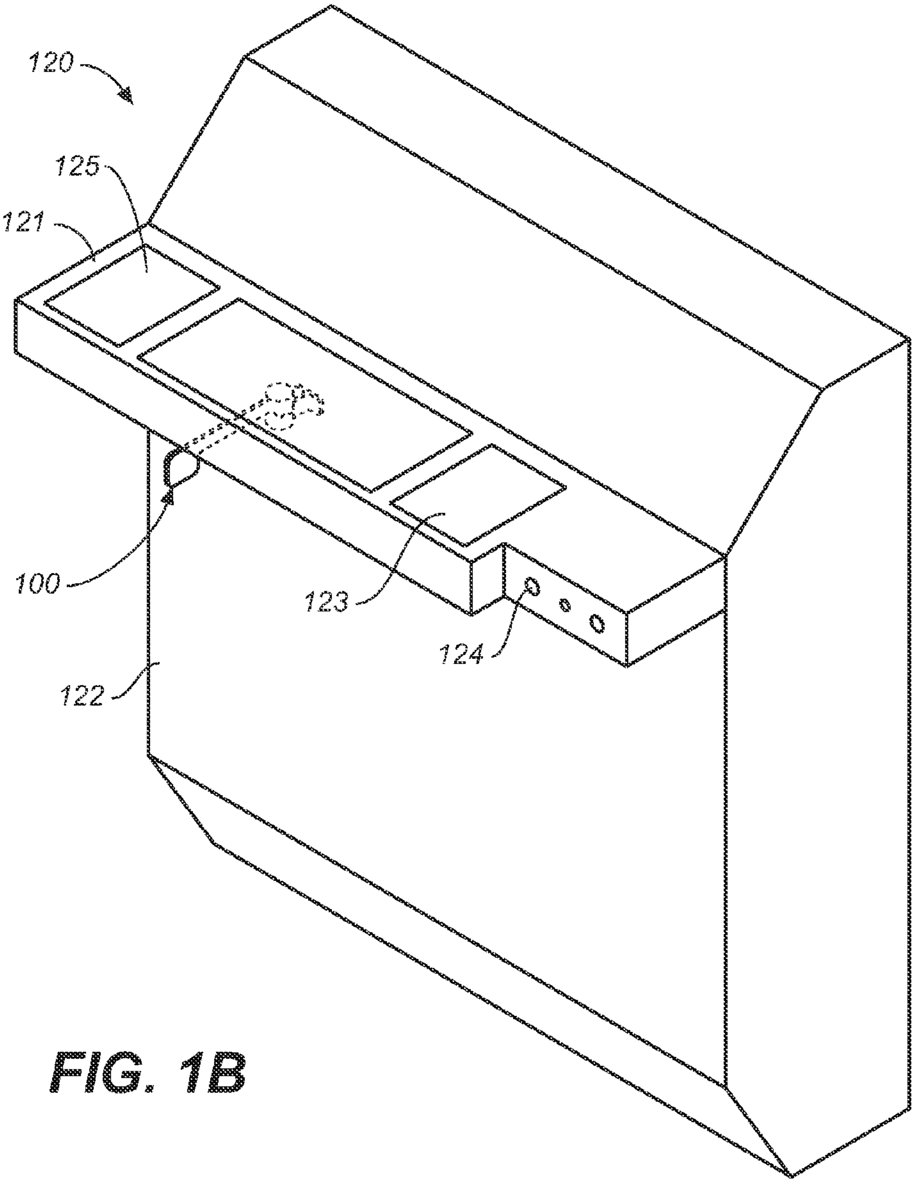
FIG. 1B shows a perspective view of a control console from which a hands-free push-to-activate device is mounted thereto according to an embodiment.

FIG. 1B shows the hands-free push-to-activate device 100 mounted to a control console 120 horizontally on a surface 122 underneath a control panel 121. For other embodiments, the hands-free push-to-activate device 100 may be mounted vertically on a surface underneath the control panel 121. Accordingly, an operator can engage the hands-free push-to-activate device 100 simultaneously while operating other control knobs and buttons on the control panel 121. Furthermore, the hands-free push-to-activate device 100 may be positioned at a suitable location where the assembly can be engaged by an operator's knee (or area around the knee). Because most operators' knees (or knee area) will be in approximately the same area beneath the control panel 121, the hands-free push-to-activate device 100 may be applicable to operators of varying sizes.

For an embodiment, the hands-free push-to-activate device 100 may be coupled to a comparator (or digital comparator) within a processing system 123 as shown in FIG. 1B. For the embodiment, the comparator compares a voltage output measured by the measuring instrument 104 (refer to FIG. 1A) to a reference threshold voltage and enables a desired system function or maintains the system function in a disabled state. If the voltage output is equal to or greater than the reference threshold voltage, the desired system function is enabled. However, if the voltage output is less than the reference threshold voltage, the desired system function remains disabled.

For example, when the hands-free push-to-activate device 100 comprises a push to talk assembly, the system function may be a communication system. Accordingly, the communication system may be enabled when the voltage output, measured by the measuring instrument 104 (refer to FIG. 1A), is equal to or greater than the reference threshold voltage within the comparator. Please refer to FIGS. 1A and 1B for the additional embodiments provided below.

As such, the hands-free push-to-activate device 100 may be used by pilots, co-pilots, or other operators within a mission console aboard an aircraft. For an embodiment, the mission console is within a pilot station aboard the aircraft. A pilot may initiate communication with a group of passengers aboard an aircraft by deflecting the deflectable arm 101 of the assembly to engage communication within an intercom system. For an alternative embodiment, the hands-free push-to-activate device 100 may be configured to allow communication between a pilot and airline personnel. Accordingly, the hands-free push-to-activate device 100 may allow multiple directions of communications.

Another example of how the comparator may be utilized is when the hands-free push-to-activate device 100 is used within a gaming system. For example, for a race car game, the hands-free push-to-activate device 100 may be used to initiate a "boost" or acceleration for a vehicle operated by a gamer. Alternatively, the assembly can also be used to make an "audible call" in a football game. Accordingly, the hands-free push-to-activate device may be used to initiate a variety of gaming system functions, according to design. As such, the game function may be enabled when the voltage output measured by the measuring instrument 104 is equal to or greater than the reference threshold voltage within the comparator.

The hands-free push-to-activate device 100 may be used in other embodiments. For example, the hands-free push-to-activate device 100 may be mounted to a piano or organ and may be used to operate on automated page turner. That is, the system function in this embodiment is an automated page turner. Accordingly, the automated page turner may be enabled when the voltage output measured by the measuring instrument 104 is equal to or greater than the reference threshold voltage within the comparator.

For an embodiment, the system function is normally disabled, and is only enabled when the amount of voltage change measured by the measuring instrument 104 exceeds the reference threshold voltage within the comparator.

The measuring instrument 104, in one embodiment, is a strain gauge 104. As is well known in the art, a strain gauge 104 may comprise a Wheatstone bridge, and a flexible substrate mounted to a metallic foil pattern. Upon a force applied to the deflectable arm 101, deflectable arm 101 deflects and the flexible substrate deforms which causes the metallic foil pattern to deform. Accordingly, a change in electrical voltage occurs within the metallic foil. This change in voltage may be measured by the Wheatstone bridge within the strain gauge 104.

When the amount of voltage change measured by the strain gauge 104 exceeds the reference threshold voltage within the comparator, the desired system function is activated. When the amount of voltage output sensed by the strain gauge 104 is less than the reference threshold voltage, the desired system function remains disabled if the system function was previously disabled or disables if the system function was previously enabled.

For an embodiment, an operator can adjust the amount of deflection needed to set the "on" condition or engage the communication function of the hands-free push-to-activate device 100. For example, a rheostat 124 (or other suitable potentiometers) shown in FIG. 1B may be coupled to the strain gauge 104 to filter the voltage output of the strain gauge 104 that will be subsequently assessed by the comparator. For an embodiment, the rheostat 124 may be mounted or coupled to the hands-free push-to-activate device 100 or the surface of the control console 120.

Additionally, an operator may set the "on" function of the hands-free push-to-activate device to a given threshold voltage. For an embodiment, the threshold voltage is set in the millivolt (mV) range.

For example, when the hands-free push-to-activate device 100 comprises a push-to-talk assembly, a comparator compares a filtered output voltage from the rheostat 124 to a reference threshold voltage. A communication system is enabled if the filtered output voltage is equal to or greater than the reference threshold voltage. When the filtered output voltage from the rheostat 124 is less than the reference threshold voltage, the communication system remains disabled.

Controlling the level of voltage that travels from the strain gauge by the rheostat 124 may allow an operator to manipulate the engage function of the hands-free push-to-activate device. As such, the hands-free push-to-activate device may be tailored such that it remains disengaged during inadvertent taps or nudges. Alternatively, an operator may choose to set the engage ("on") function of the assembly to a relatively lower voltage output level, which may require less deflection of the deflectable arm 101.

The deflectable arm 101 may be paddle-shaped as shown in FIG. 1A. That is, deflectable arm 101 may comprise a first portion 117 and a second portion 118, wherein the first portion 117 is slender in width but longer in length than the second portion 118. It will be appreciated by one having ordinary skill in the art that the deflectable arm 101 may have any suitable shaped known in the art such that a force may be adequately applied thereto to cause a deflection.

Additionally, the deflectable arm 101 may comprise a variety of materials or combination of materials such that a force can be adequately applied thereto. For various embodiments, the deflectable arm 101 may comprise wood, metal, plastic, or a composite thereof.

As stated, an operator may apply a force to the deflectable arm 101. To accommodate an operator, the length of deflectable arm 101 may be adjusted such that it can contract or extend. For an embodiment, deflectable arm 101 may comprise a set of slender members such that one member may be extended relative to the other. That is, a first member may be moved along an axis of the second member in a direction away from the mounting bracket to extend the deflectable arm. Likewise, the first member may be moved along the axis of the second member in a direction towards the mounting bracket to contract the deflectable arm.

Figure 2A:
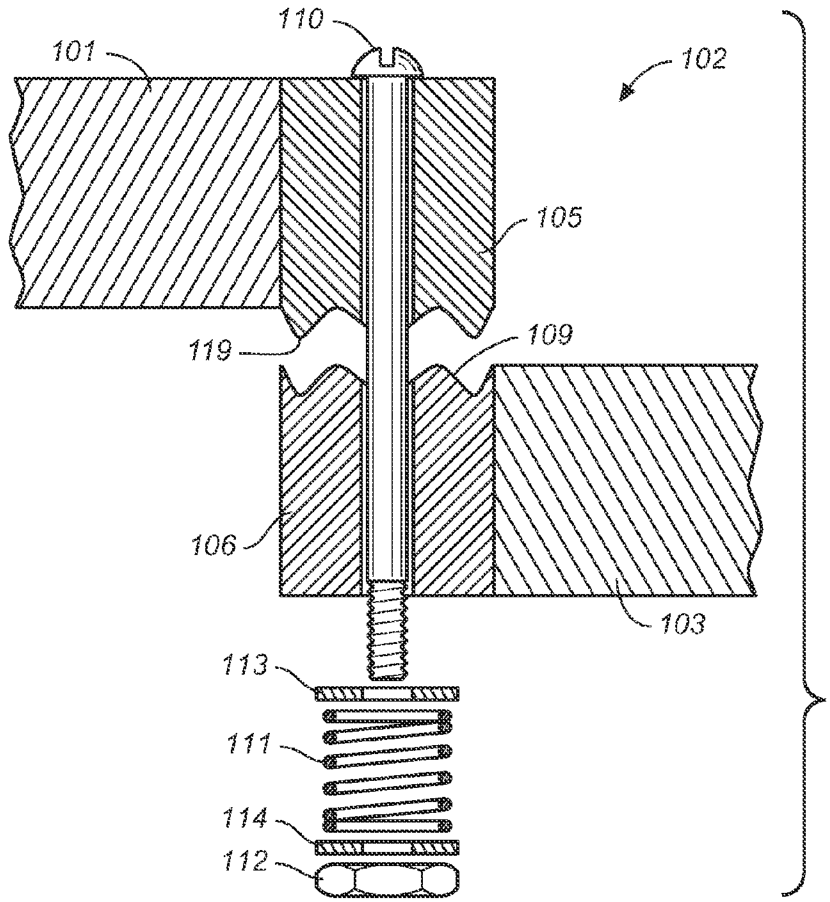
FIG. 2A shows an schematic view of an adjustable hinge according to an embodiment.
Figure 2B:
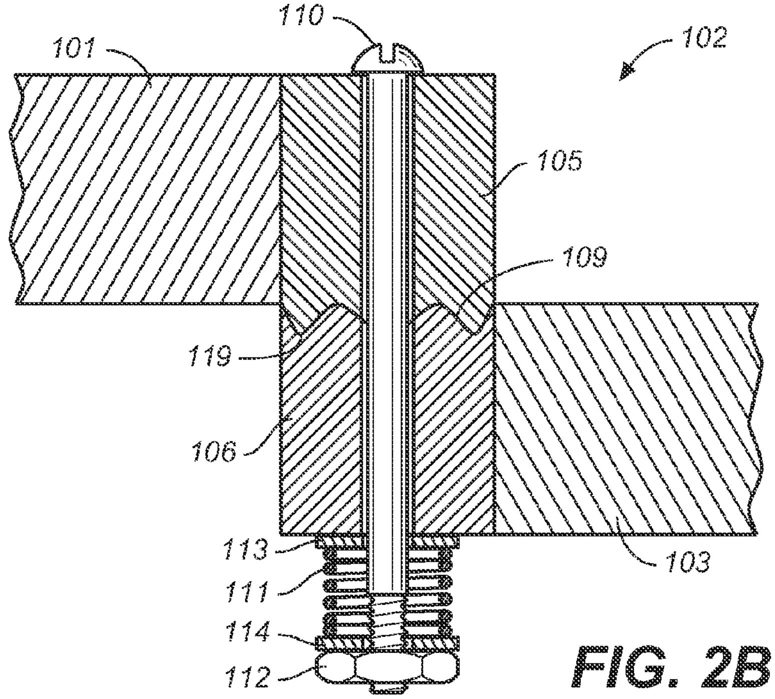
FIG. 2B shows a schematic view of the adjustable hinge according to an embodiment.

FIGS. 2A and 2B show an illustration of the adjustable hinge 102, according to an embodiment. FIG. 2A shows an exploded view of the adjustable hinge 102. As shown, an axle bolt 110 extends through first and second barrels 105, 106, and through spring 111, nut 112, and washers 113, 114 located above and below spring 111 respectively.

Additionally, FIG. 2A shows the adjustable hinge 102 attached to the deflectable arm 101 and mounting bracket 103, according to an embodiment. Particularly, first barrel 105 is attached to the deflectable arm 101 and second barrel 106 is attached to the mounting bracket 103. For an embodiment, the adjustable hinge 102 is a mechanical rotating feature from which an operator can adjust the lateral offset position of the deflectable arm 101 with respect to an operator. That is, the adjustable hinge 102 is a breakaway hinge 102, according to an embodiment. One having ordinary skill in the art will appreciate that the adjustable hinge 102 may not be limited to a breakaway hinge and that various adjustable hinges may be used within hands-free push-to-activate device 100.

As shown in FIG. 2B, the breakaway hinge 102 may include the first and second barrels 105, 106 which each have radially-corrugated sections 109, 119. That is, the corrugated peaks of first barrel 105 can fit securely within the corrugated recesses of second barrel 106 and the corrugated peaks of second barrel 106 can fit securely within the corrugated recesses of first barrel 105 such that first barrel 105 can be disposed flush with second barrel 106, as shown in FIG. 2B.

Accordingly, an operator can adjust the lateral offset position of the deflectable arm 101 by rotating the first barrel 105 relative to the second barrel 106 to increase or decrease the distance of the deflectable arm 101 to the operator. As such, by rotating the first barrel 105 relative to the second barrel 106 such that the corrugated peaks and recesses of the first barrel 105 move to adjacent corrugated recesses and peaks of the second barrel 106, an operator can tailor the distance of the deflectable arm 101 component of the hands-free push-to-activate device 100 to him or her.

Figure 3:
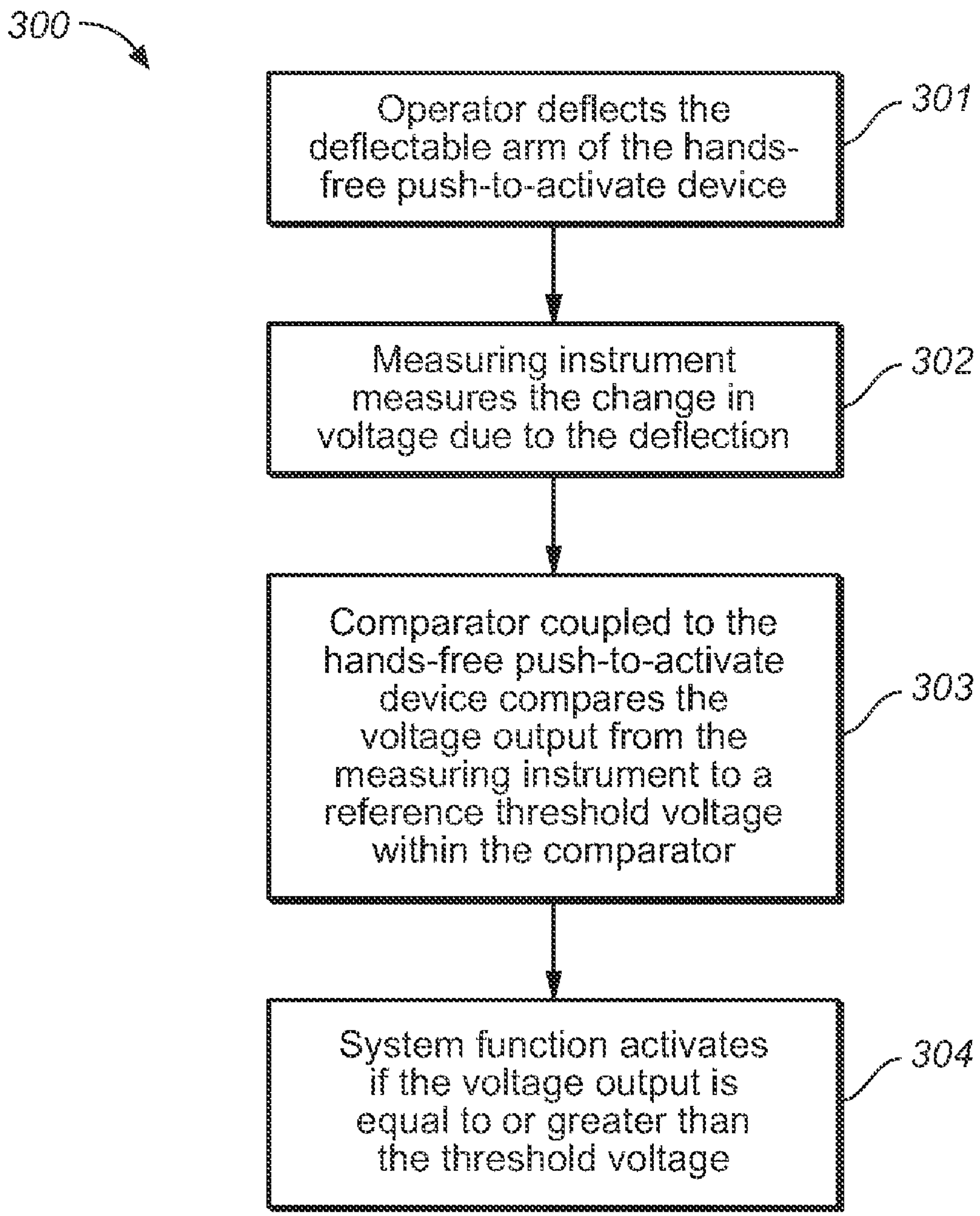
FIG. 3 is a flow chart for a method of utilizing the hands-free push-to-activate device, according to an embodiment.

FIG. 3 shows a method for utilizing the hands-free push-to-activate device 100 according to flow chart 300. As shown in block 301, an operator deflects the deflectable arm 101 of the hands-free push-to-activate device 100. Next, according to block 302 the measuring instrument 104 component of the device 100 measures a change in voltage due to the deflection which corresponds to the degree of deflection. Then, according to block 303, a comparator (or digital comparator), within a processing system 123 coupled to the hands-free push-to-activate device 100, compares the voltage output from the measuring instrument 104 to a reference threshold voltage within the comparator. A system function activates if the voltage output is equal to or greater than the threshold voltage or otherwise remains deactivated if less than the threshold voltage, as recited in block 304.

It will be appreciated that the system described in block diagram 300 is not limited to push-to-talk assemblies and that other systems, devices, and methods that use a hands-free push-to-activate device may be applicable.

For an embodiment, an operator may adjust the amount of deflection needed to engage a function of the hands-free push-to-activate device 100 by using a tabular display 125 disposed upon the control console 120. Accordingly, an operator may select a desired reference threshold voltage within a comparator to adjust the amount of deflection needed to engage a system function.

For example, an operator may manipulate the engage function of the hands-free push-to-activate device 100 by selecting a desired reference threshold voltage displayed upon the tabular display 125. An operator may use a scroll bar feature to select voltage settings not shown on the first screen of the tabular display 125. As such, the operator can increase the sensitivity of the hands-free push-to-activate device 100 by decreasing the threshold voltage within the comparator. Accordingly, the operator can enable a system such as, but not limited to, a communication system with less deflection.

Alternatively, the operator can decrease the sensitivity of the hands-free push-to-activate device by increasing the reference threshold voltage within the comparator. Thus, more deflection is required to enable the system.

It will be appreciated that the hands-free push-to-activate device may be used in various applications that use mechanical switches. It will be further appreciated that the hands-free push-to-activate device may be used in applications that use mechanical switches that have reliability problems. For example, conventional switches may incorporate moving electrical components causing spiking or arching voltage output effects. Since the hands-free push-to-activate device of the present invention does not require moving electrical components, spiking, arching, and other failure mechanisms are not experienced.

Although the present embodiment has been described in accordance with the embodiments shown, one having ordinary skill in the art will readily recognize that there could be variations to the embodiments and those variations would be within the spirit and scope of the present embodiment. Accordingly, many modifications may be made by one having ordinary skill in the art without departing from the spirit and scope of the appended claims.

What is claimed is:

1. A push-to-activate device, comprising:
- a mounting bracket coupled to a surface;
- an adjustable hinge coupled to the mounting bracket;
- a measuring instrument disposed within the mounting bracket; and
- a deflectable arm coupled to the adjustable hinge, wherein the deflectable arm can be engaged in a hands-free manner.

2. The push-to-activate device of claim 1, wherein the adjustable hinge is a breakaway hinge.

3. The push-to-activate device of claim 1, wherein the deflectable arm is engaged by an operator's knee.

4. The push-to-activate device of claim 1, wherein the adjustable hinge comprises a first barrel and a second barrel.

5. The push-to-activate device of claim 4 wherein the adjustable hinge further comprises an axle bolt extending through a center axis of the first and second barrels, a spring disposed adjacent to the second barrel and the axle bolt, and a nut disposed adjacent to the spring and bound to the axle bolt, wherein the axle bolt, spring, and nut fastens the first and second barrels together.

6. The push-to-activate device of claim 4, wherein each of the first and second barrels have corrugated sections that can be engagingly coupled to allow the first and second barrels to fit together.

7. The push-to-activate device of claim 6, wherein when the first and second barrels are engagingly coupled, a peak of the first barrel fits securely within a recess of the second barrel and a peak of the second barrel fits securely within a recess of the first barrel such that the deflectable arm can accommodate several lateral offset positions for an operator.

8. The push-to-activate device of claim 1, wherein the measuring instrument is a strain gauge.

9. The push-to-activate device of claim 1, wherein the deflectable arm is paddle-shaped.

10. The push-to-activate device of claim 1, wherein the assembly is mounted horizontally on a surface of a console.

11. The push-to-activate device of claim 8 further comprising a rheostat coupled to the strain gauge.

12. The push-to-activate device of claim 1, wherein the push-to-activate device is utilized within a system.

13. The push-to-activate device of claim 12, wherein the system is in the group consisting of a gaming system, communication system, and a music system.

14. A method, comprising:

providing an apparatus, the apparatus comprising a mounting bracket coupled to a surface, an adjustable hinge coupled to the mounting bracket, a measuring instrument disposed within the mounting bracket, and a deflectable arm coupled to the adjustable hinge, wherein the deflectable arm can be engaged in a hands-free manner; and utilizing the adjustable hinge to adjust the deflectable arm to fit a size constraint of an operator.

15. The method of claim 14, wherein the adjustable hinge includes a first and second barrel including corrugated sections that can be engagingly coupled to allow the first and second barrels fit together.

16. The method of claim 14 utilizing the deflectable arm to fit a size constraint of an operator comprises rotating the first barrel relative to the second barrel such that a corrugated peak of the first barrel shifts to a corrugated recess of the second barrel.

17. The method of claim of 14, wherein the deflectable arm is knee operated.

18. A push-to-activate device, comprising:

a T-shaped mounting bracket mounted to a surface;

a breakaway hinge coupled to the T-shaped mounting bracket, wherein the breakaway hinge comprises a first barrel and a second barrel and wherein the first and second barrels are engagingly coupled such that a peak of the first barrel fits securely within a recess of the second barrel and a peak of the second barrel fits securely within a recess of the first barrel;

a paddle-shaped deflectable arm coupled to the breakaway hinge, wherein the paddle-shaped deflectable arm comprises a first portion and a second portion, and wherein the first portion is slender in width but longer in length than the second portion and wherein the paddle-shaped deflectable arm can be deflected by the operator's knee; and a strain gauge disposed within the T-shaped mounting bracket, wherein the strain gauge detects the deflection of the paddle-shaped deflectable arm.

19. The push-to-activate device of claim 18, wherein a rheostat is coupled to the strain gauge.

20. The push-to-activate device of claim 18, wherein when the first and second barrels are engagingly coupled, the paddle-shaped deflectable arm can accommodate several lateral offset positions for an operator.

* * * * *